US010459999B1

(12) United States Patent
O'Hara

(10) Patent No.: US 10,459,999 B1
(45) Date of Patent: Oct. 29, 2019

(54) SYSTEM AND METHOD FOR CONCISE DISPLAY OF QUERY RESULTS VIA THUMBNAILS WITH INDICATIVE IMAGES AND DIFFERENTIATING TERMS

(71) Applicant: Thomas Paul O'Hara, Austin, TX (US)

(72) Inventor: Thomas Paul O'Hara, Austin, TX (US)

(73) Assignee: SCRAPPYCITO, LLC, Austin, TX (US)

( * ) Notice: Subject to any disclaimer, the term of this patent is extended or adjusted under 35 U.S.C. 154(b) by 0 days.

(21) Appl. No.: 16/041,730

(22) Filed: Jul. 20, 2018

(51) Int. Cl.
| | |
|---|---|
| *G06F 16/90* | (2019.01) |
| *G06F 17/27* | (2006.01) |
| *G06F 16/9535* | (2019.01) |
| *G06N 5/00* | (2006.01) |
| *G06F 17/18* | (2006.01) |
| *G06N 20/00* | (2019.01) |
| *G06F 16/9038* | (2019.01) |

(52) U.S. Cl.
CPC ...... *G06F 16/9535* (2019.01); *G06F 16/9038* (2019.01); *G06F 17/18* (2013.01); *G06F 17/2715* (2013.01); *G06N 5/00* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,706,365 | A * | 1/1998 | Rangarajan | G06F 17/30619 707/728 |
| 6,460,036 | B1 * | 10/2002 | Herz | G06F 17/30867 348/E7.056 |
| 8,775,436 | B1 * | 7/2014 | Zhou | G06K 9/00469 707/748 |
| 2007/0016553 | A1 * | 1/2007 | Dumais | H04L 51/34 |
| 2007/0074125 | A1 * | 3/2007 | Platt | G06F 16/957 715/760 |
| 2008/0195601 | A1 * | 8/2008 | Ntoulas | G06F 17/30616 |
| 2011/0004588 | A1 * | 1/2011 | Leitersdorf | G06F 17/30864 707/711 |

(Continued)

*Primary Examiner* — Usmaan Saeed
*Assistant Examiner* — Yu Zhao
(74) *Attorney, Agent, or Firm* — Georgiy L. Khayet

(57) ABSTRACT

A system for concise display of query results via thumbnails consisting of images and keywords is disclosed. The query result display system has a query result display module, comprising computer-executable code stored in non-volatile memory, a processor, and a user interface device. The query result display module, the processor, and the user interface device are configured to perform a query of the plurality of indexed documents, determine one or more indicative images for each of a plurality of indexed documents, and provide a set of result documents drawn from the plurality of indexed documents, perform a distinguishing keyword analysis for the set of result documents based on a measure of differentiation, determine one or more differentiating terms for each result document based on the distinguishing keyword analysis, and depict each result document using a representative image incorporating the at least one distinguishing images along with the at least one differentiating terms.

20 Claims, 6 Drawing Sheets

(56) References Cited

U.S. PATENT DOCUMENTS

| | | | |
|---|---|---|---|
| 2012/0076414 A1* | 3/2012 | Xu | G06F 17/30244 382/176 |
| 2014/0298378 A1* | 10/2014 | Kelley | H04N 21/8133 725/32 |
| 2014/0372419 A1* | 12/2014 | Li | G06F 16/9038 707/723 |
| 2017/0249367 A1* | 8/2017 | Bergsma | G06F 3/0482 |
| 2018/0018564 A1* | 1/2018 | Erenrich | G06F 17/30011 |
| 2018/0084023 A1* | 3/2018 | Stoop | H04L 65/601 |

* cited by examiner

Community service - Wikipedia
Community service is a non-paying job performed by someone or a group of people for the benefit of the public or its institutions. Performing community service is not ...
https://en.wikipedia.org/wiki/Community_service

Home - CommunityService.org
Recent Posts. My online volunteering experience; Volunteering at Costa Rica – A Community Service story; Volunteering at Never Cry Wolf Sanctuary – A Community ...
http://communityservice.org

Community service - definition of community service by The ...
Community service n. 1. Services volunteered by individuals or an organization to benefit a community or its institutions. 2. Similar work performed by law offenders ...
http://www.thefreedictionary.com/community+service

What is Community Service? (with pictures) - wiseGEEK
Community service is an action that benefits the community. Though sometimes required as a punishment, community service actually...
http://www.wisegeek.org/what-is-community-service.htm

Court Ordered Community Service - CommunityService.org
I was required to complete 80 hours of community service by May. I was running out of time to get them done. I had to worry about work, school, and just life in general.
http://communityservice.org/court-ordered-community-service

Serve In Your Community | Corporation for National and ...
The Corporation for National and Community Service plays a vital role in supporting the American culture of citizenship, service, and responsibility.
https://www.nationalservice.gov/serve-your-community

Community Service - tnachieves.org
WHAT are the deadlines for submitting my community service? Complete and submit 8 hours by each deadline!
https://tnachieves.org/community-service

Welcome | ServiceNow Community
How to Improve Service Delivery Performance with SIAM (Service Integration and Management) Now (Ends 12/30/16 4:00 PM) Listen to Chuck Tomasi's ServiceNow Unscripted ...
https://community.servicenow.com

Our Programs | Corporation for National and Community Service
Each year, more than 5 million individuals of all ages and backgrounds help meet local needs through a wide array of service opportunities through the Corporation for ...
https://www.nationalservice.gov/programs

Community Service: Top 10 Reasons to Volunteer
Thinking of becoming a volunteer? See a list of reasons that will help you make up your mind.
https://students.ucsd.edu/student-life/involvement/community/reasons.html PRIOR ART
FIG. 1a

US 10,459,999 B1

SYSTEM AND METHOD FOR CONCISE DISPLAY OF QUERY RESULTS VIA THUMBNAILS WITH INDICATIVE IMAGES AND DIFFERENTIATING TERMS

TECHNICAL FIELD

The present disclosure generally relates to a system and method for display of results, and more particularly to a system and method for display of query results via thumbnails comprising images and keywords.

BACKGROUND

Traditional search engine results typically involve textual summaries of corresponding documents found in the search, along with meta-data such as the title and URL. Accordingly, this information is predominantly textual. Occasionally an image may be shown for specialized documents, such as for animals, celebrities, or videos; however, images represent a small percentage of the overall results. Subsequently, a major hindrance for users is the need to scan the textual results linearly to find documents of interest.

FIG. 1a illustrates how conventional search engine might present results for a relatively abstract query such as "community service" (e.g., array 1). The conventional web search results include a Wikipedia article, a definition provided by internet sources, high-level overviews, and information about organizations (e.g., objects 5, 10, 15, 20, 25, 30, 35, 40, 45, and 50). In this conventional format, each result includes a document title, an excerpt from the document, and a document URL. To review the conventional results, a user typically skims the text from top to bottom of a results page.

Conventional search results focus on summarization using text excerpts. Therefore, the users read significant amount of text while reviewing results, which is often difficult for many users to process easily. Additionally, it will be difficult for many users to manipulate the textual results (e.g., to rearrange the order or adjust the size of individual results) without exporting the data to an external program.

The system and method described here overcome the shortcomings set forth above or other deficiencies in the existing technology.

SUMMARY OF THE DISCLOSURE

The present disclosure is directed to a query result display system. In one embodiment, the query result display system may comprise a query result display module, itself comprising computer-executable code stored in non-volatile memory, a processor, and a user interface device. The query result display module, in communication with the processor and the user interface device, is configured to perform a query of a plurality of indexed documents, provide a set of result documents drawn from the plurality of indexed documents, determine one or more indicative image(s) for each of the result documents, perform a distinguishing keyword analysis for the set of result documents based on a measure of differentiation, determine one or more differentiating terms for each result document based on the distinguishing keyword analysis, and display each result document on the user interface using a representation thereof, such as a thumbnail, said representation incorporating the at least one of the salient image(s) for each result document along with the at least one differentiating terms.

As used herein, indicative image means an image that is either salient for a particular document or discriminatory with respect to a document set. Representative image, as used herein, shall include but not be limited to any type of multimedia, such as images, photos, videos, audio, and the like, and shall also refer to thumbnails or other encapsulations or representations thereof.

In another embodiment, the present disclosure may be directed to a computer-implemented method for display of query results. The method comprises performing a query of the plurality of indexed documents, providing a set of result documents drawn from the plurality of indexed documents, determining one or more indicative images for each of the result documents, performing a distinguishing keyword analysis for the result documents based on a measure of differentiation, determining the indicative image(s) for each of the result documents based on the differential analysis, and displaying a representative image, such as a thumbnail, for each result document including the indicative image(s) and one or more differentiating terms.

FIG. 1b illustrates an exemplary embodiment detailing improvements made possible by this approach. In this preferred embodiment, the results display become a grid of N rows and M columns. In the example, there is a row for each pair of thumbnails {(105, 110), (115, 120), (125, 130), (135, 140), (145, 150)}, where the thumbnail number is 100 higher than the corresponding original entry. However, in general, the grid dimensions are arbitrary. In addition, the example illustrates that the snippet text from object 10 is converted to the popup display element 111, which helps to maximize the display of informative information.

BRIEF DESCRIPTION OF THE DRAWINGS

FIG. 1a illustrates a conventional search result;

DETAILED DESCRIPTION

Figure 1B:
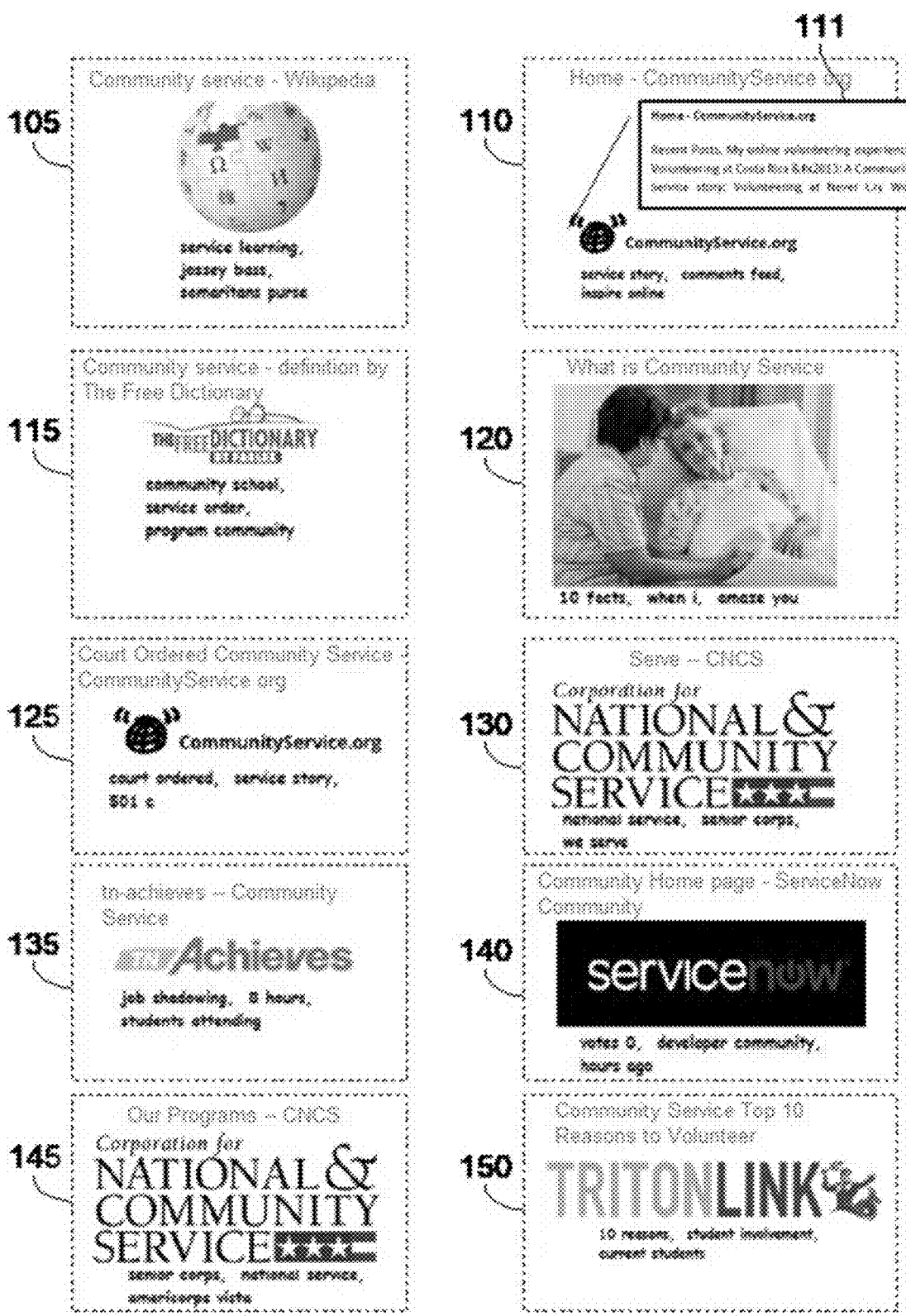
FIG. 1b illustrates an improved search result made possible with this invention.

One invention disclosed herein is a computer-implemented system and method for presenting textual document query results concisely by depicting, visually, auditorily or by other means, differences in search engine results via one or more representative images labeled with one or more keywords. In one embodiment, the system and method incorporate thumbnails with differentiating phrasal terms overlaid upon images indicative of the underlying document. This helps the user to better distinguish the results without having to read detailed textual summaries (e.g., result snippets as illustrated in FIG. 1a). Notably, the computer-implemented system and method provide differentiation through both salient images and distinguishing terms forming each thumbnail of the result set (e.g., thereby providing a combination of discriminating images and differentiating terms). Additionally, exemplary supporting processes disclosed herein allow for enhanced discrimination of each search result.

Figure 2:
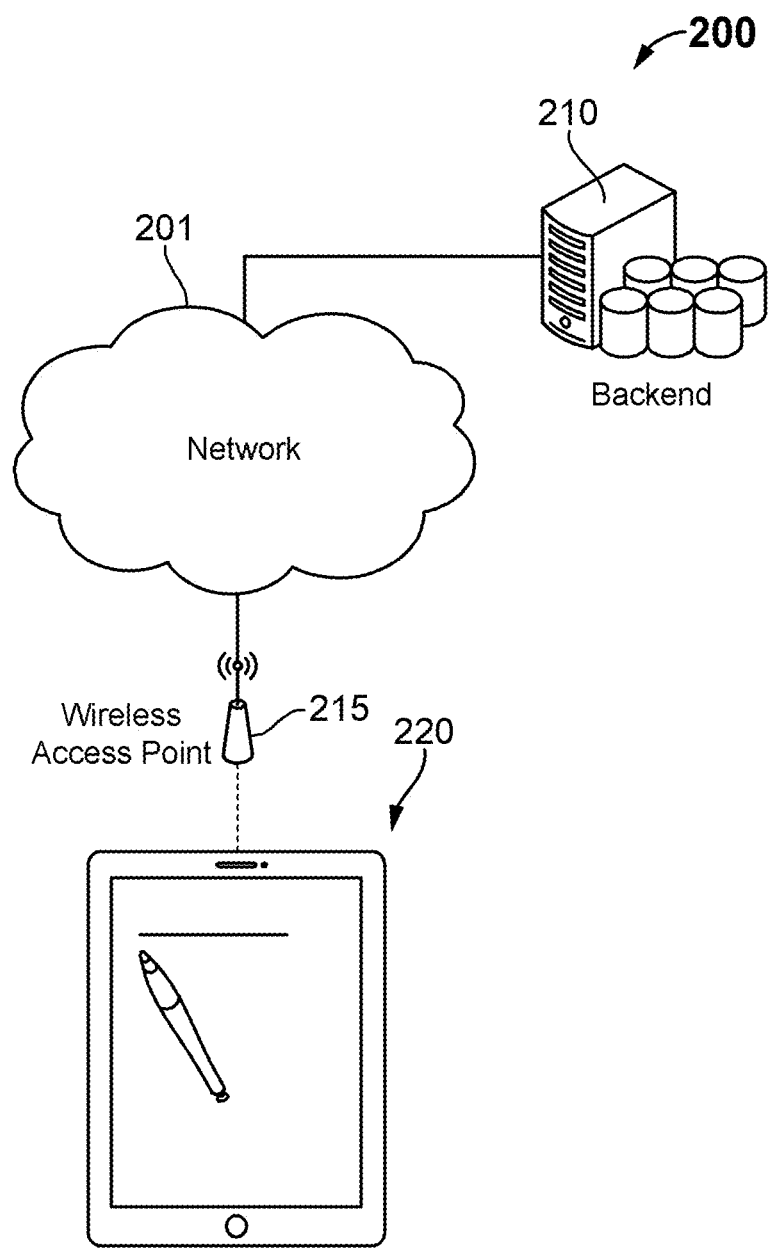
FIG. 2 is a schematic view of a system of the present invention.

FIG. 2 illustrates a system 200 for the display of query results. System 200 comprises a query result display module 210 and a user interface 220. Query result display module 210 and user interface 220 are connected via network 201. Query result display module 210 communicates with other components of system 200 via network 201. In one embodiment, the query result display module 210 includes computer-executable code stored in non-volatile memory. Query result display module 210 also includes a processor. Query result display module 210 is configured to retrieve, store, process, and analyze data transmitted to and from one or more user interfaces 220.

In one embodiment, the query result display module 210 performs analysis using the data received from one or more user interfaces 220. As disclosed elsewhere herein, this process can involve the use of several techniques from artificial intelligence (AI), including, without limitation, machine learning (ML) for document topic inference and natural language processing (NLP) for term filtering. In one embodiment, the system 200 (e.g., query result display module 210) may prepare and submit datasets and variables to cloud computing clusters (e.g., via network 201 using wireless transmission such as over 5G LTE networks).

In another embodiment, the user interface 220 may include a touchscreen device (e.g., of a smartphone, a tablet, or any suitable computing device), a computer keyboard and monitor (e.g., desktop or laptop), an audio-based device for entering input or receiving output via sound, a tactile-based device for entering input and receiving output based on touch or feel, a dedicated user interface designed to work specifically with other components of system 200, or any other suitable user interface. Display 225 includes any one of a computer monitor, a touchscreen, or any other suitable type of output, which provide raw data, query results, or predictive analysis results to a user. Display 225 includes a graphical user interface to facilitate entry of input or output of computations (e.g., to query a database and show the retrieved data).

Data related to system 200 is exchanged with users via any desired I/O technique. For instance, data (e.g., queries and query results) related to system 200 is input by users or provided to them via user interface 220 (e.g., a smartphone). A user interacts with interface 220 to query a database (e.g., index of an internet search engine) and to receive query results via network 201 (e.g., a company's intranet).

Figure 3:
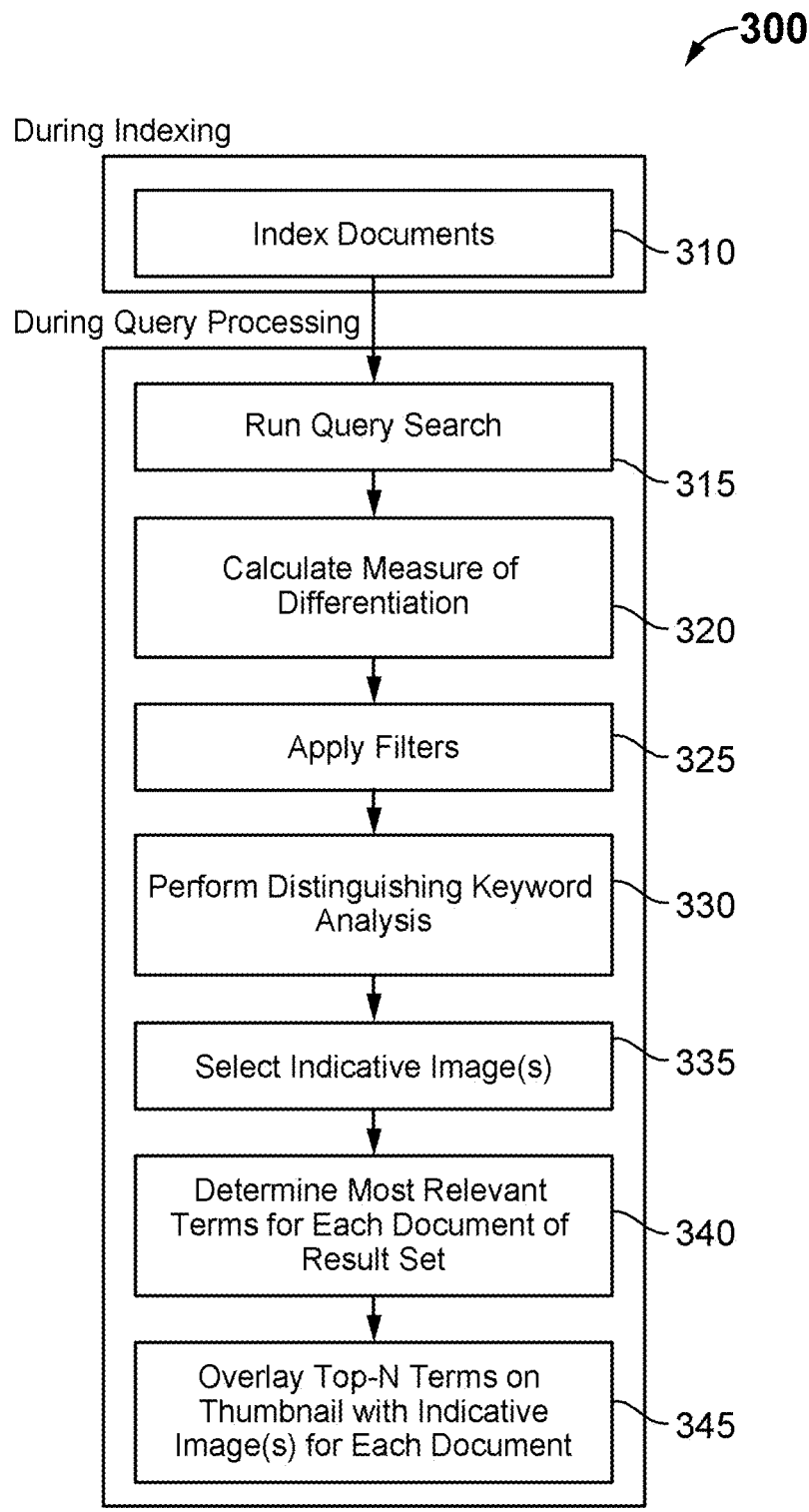
FIG. 3 depicts a process of this invention with query time differentiation.

FIG. 3 depicts an exemplary process 300 for displaying differentiated query results, wherein most operations are performed at query time for the purpose of ensuring that the differentiation is related to the set of documents matching the query. This is also suitable for meta-search engines, which do not have access to the underlying search index. While the specified steps are linear, the steps may also be performed in parallel, be iterative, or be optional entirely. For instance, system 200 may also be configured to use different steps or fixed steps in process 300 based on user preference.

At step 310, system 200 indexes documents to determine the associated constituent terms and vice-versa (i.e., an "inverted" index). The indexing can also be performed externally to the system. The system enables a user to perform a query search at step 315.

At step 320, system 200 calculates a measure of differentiation to be used throughout process 300, as disclosed below. Terms are selected that sufficiently differentiate the target document from other documents matching the user search results. Phrasal terms are included by the system via n-gram analysis. In one embodiment, the system performs a frequency analysis to count the occurrence of all pairs of tokens (e.g., bigrams) from each text-formatted document (e.g., the term frequency or "TF"). In another embodiment, the system utilizes a probabilistic approach for determining differentiating terms that uses the notion of cue validities (derived from usage in cognitive psychology) to describe natural categories. An extension of the process to encompass longer phrases is accomplished using triples, quartets, etc. (i.e., n-grams for n consecutive terms, with n greater than two). Unigrams are also possible with n set to 1, but unigrams are often uninformative. The overlay space for text in the thumbnails is generally limited, so it is often neither practical nor aesthetically pleasing to show the entire search result text snippet (e.g., from FIG. 1a); instead, differentiating terms are used (e.g., as in FIG. 1b).

In one exemplary embodiment, System 200 may maintain a separate count for a number of documents of the collection in which the terms occur (e.g., the document frequency or "DF"). Given these two values, TF and DF, a single measure of document importance is computed: the term frequency inverse document frequency (TF-IDF) score. It may be computed, for instance, as follows: TF-IDF=TF×log(N/DF), where N is the number of documents. A relative TF value is often used in the process, but an integral value can be used as well. The logarithm of the DF value is used to dampen the effect of rare terms; otherwise, the alternative formula TF-IDF=TF×(N/DF) could be used by the system. As with TF-IDF, the approach using cue validities is empirical, with the set of differentiating representative images not determined in advance but instead "emerging" from the data (i.e., the indexed documents). The TD-IDF is merely one of numerous measures of document importance which may be computed. Others include but are not limited to: the Dice coefficient, mutual information, and cross entropy.

At step 325, system 200 applies filters to the differentiating term process of step 320. For example, the initial list of differentiating phrases determined at step 320 might contain idiosyncratic cases. Accordingly, the system performs a filtering process at step 325 to eliminate terms likely to be uninformative.

As used herein, filtering approaches may incorporate text analytics based on statistical NLP. For instance, system 200 uses language modeling to confirm that proposed differentiating terms occur sufficiently in a suitable corpus of naturally occurring text. For terms not previously encountered by the system, the frequency of occurrence is estimated based on the occurrence frequencies of sub-terms (e.g., component n-grams). In the case of a meta-search engine without access to the underlying indexes, one approach is to use data from the Common Crawl to derive global n-gram counts for TF-IDF and language modeling filtering. Another approach is to use an application programming interface (API) for both n-gram analysis and language modeling filtering. This could be done via Microsoft's Web Language Model API or any comparable text analytics interface. One of ordinary skill in the art would appreciate that there are numerous filtering approaches that could be utilized with embodiments of the present invention, and embodiments of the present invention are contemplated for use with any appropriate method.

According to an embodiment of the present invention, System 200 may be configured to perform filtering using rules to cover special cases, such as dates, numerals, or extraneous text associated with web documents (e.g., HTML meta-text or website boilerplate content). These could be predetermined rules (e.g., as in knowledge-based AI) or rules determined by the system during an operation of process 300. Furthermore, the system may be configured to blacklist phrases as well as lower-weighted overlapping phrases.

At step 335, system 200 determines one of more images for inclusion in a representative image based on two separate aspects. In preferred embodiments, the system is configured to utilize machine learning to find salient images with respect to the document itself; and, it incorporates differentiation of terms associated with images to find ones that discriminate the results from each other.

In one embodiment, the ML component incorporates simple features for image selection, such as image size, relative offset in the document, and distribution of color. In another embodiment, the ML component incorporates complex features such as the degree of overlap for image-related terms derived via object recognition with the top terms in the document title or body. In either case, this aspect is, in preferred embodiments, based on a local salience measure (i.e., derived only from the document). In contrast, the differentiation metric over text associated with the image with respect to the result set is a global aspect. System 200 utilizes TF-IDF or another preferred differentiation metric such as cue validities over the text associated with images. Relevant text for the image could be obtained from, but not limited to, the caption, a window around the image, or object recognition. The differentiation metric is derived by averaging the TF-IDF scores for the image terms. This adds a preference toward selecting images reflecting information particular to a given document more so than other images. This global metric can be combined with the local one discussed above either using hard-coded metric weights or ones derived via regression. Alternatively, it could be a feature added to the image salience features to streamline the process of training the image selection classifier.

At step 335, system 200 may be configured to utilize alternative ways to select one or more indicative images for each indexed document relying upon suitable techniques for image selection (e.g., techniques trading off generality vs. specificity). For each indexed document, system 200 may be configured to select the indicative image(s) conveying a main topic for the document (e.g., web page), without being too coarse-grained or too fine-grained in said selectivity. This could be accomplished in numerous ways, for example, by weighting a Google PageRank type score for each image from the document in accordance with the inverse occurrence count across search results of the indexed documents (e.g., during query processing). Because images directly embedded in a document may not be effective topic indicators, the system may also be configured to analyze images from documents higher in a document hierarchy (i.e., "ancestor" documents).

In case the documents do not have associated images (e.g., either directly or through ancestors), the system may be configured to determine images that convey the document topics through text categorization. Rather than determining a single image for each search result, the system may be configured to select multiple images via thresholding on the above-disclosed ranking scores (e.g., based on standard deviations from the mean).

The overall image selection process utilized by the system 200 at step 335 may be heuristic in nature (e.g., as in knowledge-based AI) based on the wide range of ways in which indicative images are determined. For example, for common websites having diverse topics, the system may be configured to whitelist the most informative image if the image is not often ranked highly but is nonetheless considered to be a useful differentiator with respect to other images that are higher in ranking. In contrast, relatively common images from agglomerative-type data sources (e.g., websites) can be blacklisted by the system, so that documents having topics that are different from each other do not have the same selected representative image.

In further embodiments, system 200 may be configured to apply alternative or additional heuristics for image selection at step 335 (e.g., during some of the subsequent steps as disclosed below). For example, showing a company logo would be desired for a selected indicative image over other images from a web page, provided that the selected logo image would not occur frequently in the search results. Alternatively, for companies having diverse types of business, the system might select an image indicative of a particular section of a company website. For instance, for a company that offers a variety of software products (e.g., Microsoft), the system could be configured to select a separate indicative image for documents under software development than it would for documents under end-user applications.

At step 335, system 200 recognizes instructions within a document (e.g., from a website designer) to override image selection, such as through some specification in the source of an indexed document (e.g., HTML or XML). Such instructions could be provided to the system through HTML markup (e.g., through comments until an appropriate extension is added to the HTML format). Alternatively, a filename convention for overriding indicative images could be used for an indexed document (e.g., an affix as in basename-.topic.png). This is also useful for non-HTML documents without embedded images.

At step 335, system 200 may be configured to integrate image recognition or image retrieval methods into process 300. For example, images in a given document may be categorized by the system to determine those images with the most relative overlap of categories with respect to those inferred for the document. The system performs image retrieval based on the distinguishing keywords (e.g., determined at step 330) to find images in the same website or in whitelisted websites.

At step 340, system 200 may be configured to determine the most relevant terms for each document of the set of search result documents. During query processing, the differentiation analysis may be performed at step 340 (e.g., the TF-IDF analysis disclosed above). At step 345, the system may be configured to overlay the top terms on the thumbnail with the indicative image(s) for each result document, with optional differentiation weights (e.g., TF-IDF values).

Figure 4:
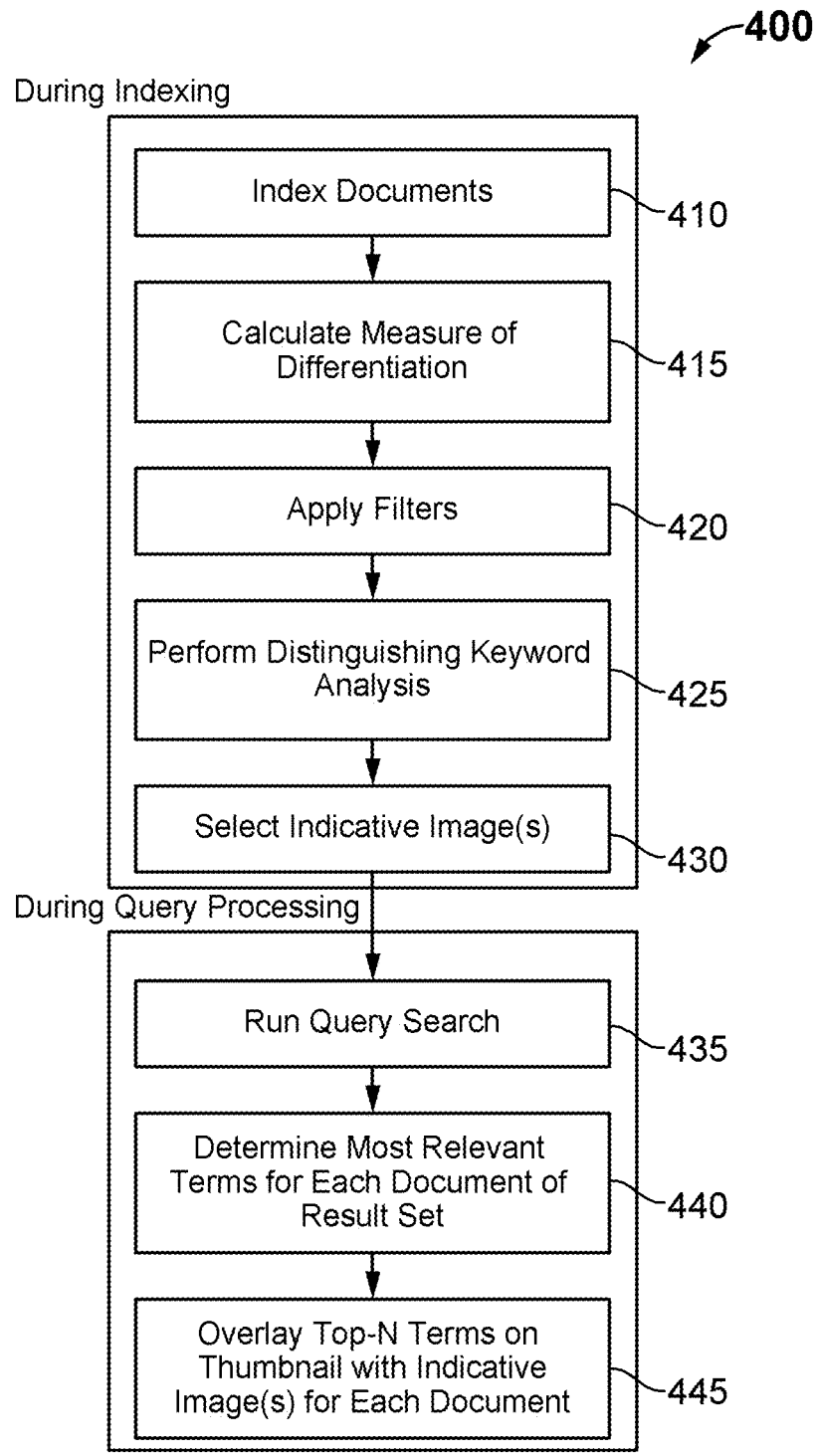
FIG. 4 depicts a process of this invention with indexing time differentiation.

FIG. 4 illustrates a process 400 similar to process 300 of FIG. 3, except that differentiation is done at indexing time, which speeds up query display. For example, steps 410, 415, 420, 425, 430, 435, 440, and 445 of process 400 are similar to steps 310, 320, 325, 330, 335, 315, 340, and 345, respectively. In this exemplary case, terms are differentiated with respect to the entire document collection (e.g., rather than the set of search results). However, a user of the system 200 could choose to recalibrate the search results via a user interface option (based on desired criteria), so that the differentiation analysis becomes relative to the set of search results (e.g., "bright star" is generally uninformative relative to astronomy). Notably, while the steps are specified as linear, it is also possible for some of the steps to be executed in parallel or in an iterative fashion.

In another preferred embodiment of the present invention, system 200 may be configured to display all search results (or a subset or subsets thereof) as thumbnails based on representative images. This method can help users more readily process the visual information than would many traditional approaches. In essence, the system provides search results as a collage of labeled images that can be readily scanned by the users. Moreover, because the label text is minimized, this invention provides an easy, user-friendly technique for reviewing search engine results that is not burdensome, tedious, or exhausting to the user when reviewing large amounts of search results for an extended period of time. Moreover, users can manipulate image thumbnails or other representative images quicker than they can textual results; for instance, users can re-order and re-size results more readily by using touch-enabled or other sensory-enabled devices, such as smartphones and tablets.

Figure 5:
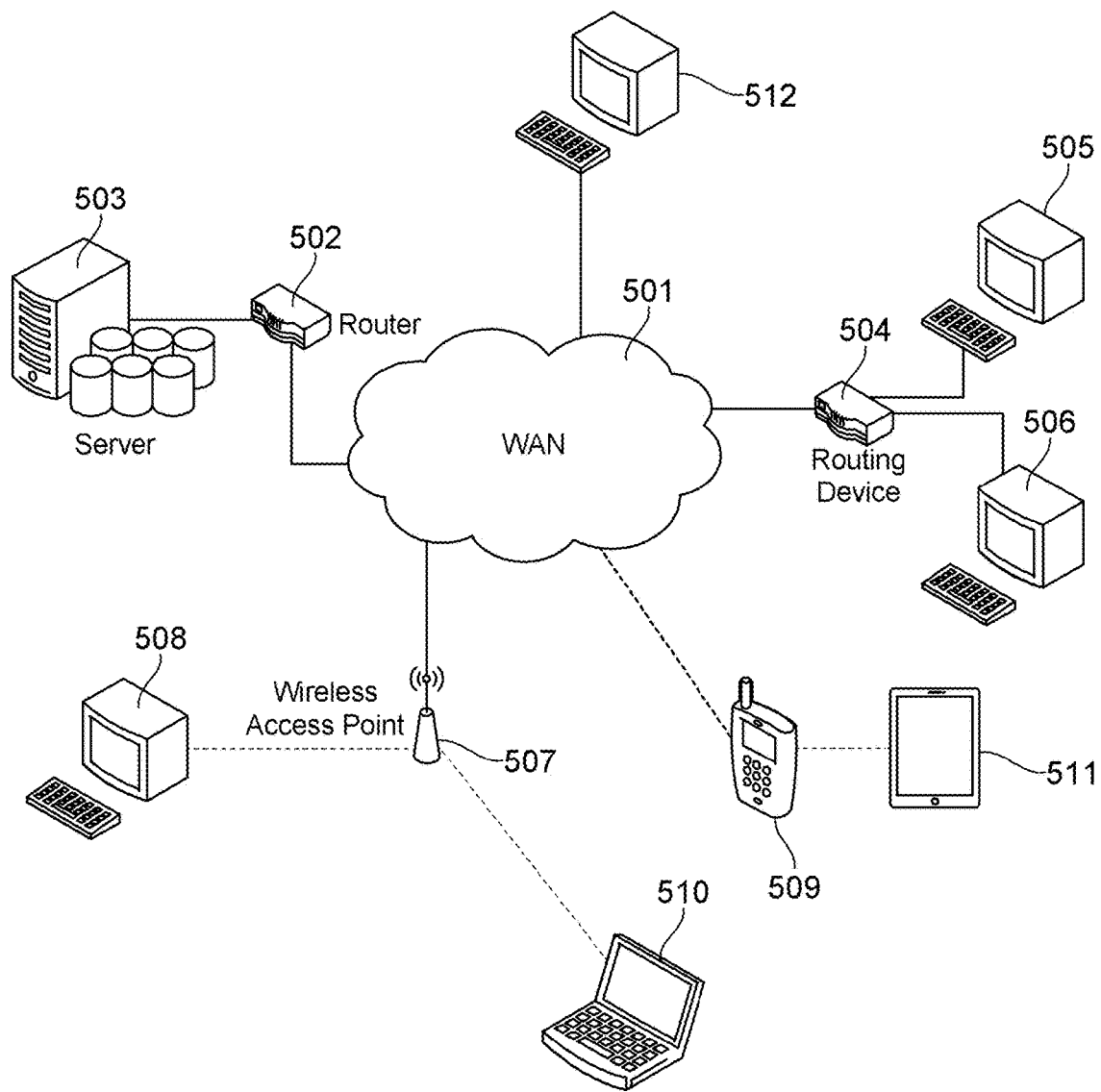
FIG. 5 is a schematic illustration of an exemplary network with connected computing devices.

FIG. 5 illustrates a schematic overview of an exemplary network of exemplary computing devices in accordance with one embodiment of the present disclosure. The system comprises one or more application servers 503 for electronically storing information used by the system. Applications in the server 503 retrieve and manipulate information in storage devices and exchange information through a WAN 501 (e.g., the Internet). Applications in server 503 are used to manipulate information stored remotely and process and analyze data stored remotely across the WAN. Exchange of information through the WAN or other network may occur by any reliable communication medium, for example, using over-the-air signals, being passed through networked systems, being directly connected to one or more WANs, or being directed through one or more routers 502. Components or modules of the system may connect to server 503 via WAN 501 or another network in numerous ways. For instance, a component or module may connect to the system i) through a computing device 512 directly connected to the WAN, ii) through computing devices 505 and 506 connected to the WAN through a routing device 504, iii) through computing devices 508, 509, and 510 connected to a wireless access point 507 or iv) through a tablet 511 via a wireless connection to the WAN. Furthermore, device 509 could be configured to act as a host (e.g., as WiFi hotspot) for connecting other computing devices.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A system for concise display of query results via thumbnails with images and keywords, comprising:
a query result display module, in the form of computer-executable code stored in non-volatile memory;
a processor; and
a user interface device;
wherein the query result display module, in communication with the processor, and the user interface device are configured to:
select at least one indicative image for each of a plurality of indexed documents by:
analyzing each of the plurality of indexed documents; and
based on the analysis, selecting, for each of the plurality of indexed documents, the at least one indicative image, wherein the at least one indicative image is indicative of a topic for each of the plurality of indexed documents, wherein the at least one indicative image is selected from one of the following:
images embedded in at least one of the plurality of indexed documents and a plurality of images related to the topic;
perform a query of the plurality of indexed documents;
provide at least one set of result documents drawn from the plurality of indexed documents;
perform a distinguishing keyword analysis for the at least one set of result documents, where the distinguishing keyword analysis comprises a measure of differentiation;
based on the distinguishing keyword analysis, determine at least one differentiating term for each result document of the at least one set of result documents, wherein the at least one differentiating term discriminates each result document from other result documents of the at least one set of result documents;
generate a representative thumbnail image associated with at least one result document of the at least one set of result documents by combining the at least one indicative image and the at least one differentiating term associated with the at least one result document; and
display the at least one result document on the user interface device by displaying the representative thumbnail image.

2. The system of claim 1, wherein the measure of differentiation is selected from a group comprising: a term frequency inverse document frequency (TF-IDF) measure, a cue validity measure, a Dice coefficient measure, mutual information measure, and a cross entropy measure.

3. The system of claim 1, wherein determining the at least one indicative image for the at least one result document comprises a heuristic-based approach.

4. The system of claim 1, wherein determining the at least one indicative image for the at least one result document comprises machine learning.

5. The system of claim 1, wherein determining the at least one indicative image for each of the at least one result document comprises averaging TF-IDF for terms associated with the images.

6. The system of claim 1, wherein the system uses text categorization to determine the at least one indicative image conveying the topic.

7. The system of claim 1, wherein the selection of the at least one indicative image for the document is accomplished by weighting a Google PageRank type score for each image according to an inverse occurrence count across search results.

8. The system of claim 1, wherein performing the query of the at least one of the plurality of indexed documents includes a search selected from a group consisting of an Internet search and an intranet search.

9. The system of claim 1, wherein the at least one differentiating term for each result document is different from the at least one differentiating term for the other result documents.

10. The system of claim 1, wherein the at least one differentiating term includes at least one phrasal differentiation term.

11. The system of claim 1, wherein the distinguishing keyword analysis is performed using n-gram analysis to include phrasal terms.

12. A computer-implemented method for concise display of query results via thumbnails with images and keywords, comprising:
  selecting at least one indicative image for each of a plurality of indexed documents by:
    analyzing each of the plurality of indexed documents; and
    based on the analysis, selecting, for each of the plurality of indexed documents, the at least one indicative image, wherein the at least one indicative image is indicative of a topic for each of the plurality of indexed documents, wherein the at least one indicative image is selected from one of the following: images embedded in at least one of the plurality of indexed documents and a plurality of images related to the topic;
  performing a query of the plurality of indexed documents;
  providing at least one set of result documents drawn from the plurality of indexed documents;
  performing a distinguishing keyword analysis for at least one set of the result documents based on a measure of differentiation;
  based on the distinguishing keyword analysis, determining at least one differentiating term for each result document of the at least one set of result documents, wherein the at least one differentiating term discriminates each result document from other result documents of the at least one set of result documents;
  generating a representative thumbnail image associated with at least one result document of the at least one set of result documents by combining the at least one indicative image and the at least one differentiating term associated with the at least one result document; and
  displaying at least one result document by displaying the representative thumbnail image.

13. The method of claim 12, further comprising the step of performing a recalibrating differentiation analysis that relativizes the differentiation analysis performed at indexing time to the set of result documents.

14. The method of claim 12, wherein determining the at least one indicative image for each of the at least one result document comprises machine learning.

15. The method of claim 12, wherein determining the at least one indicative image comprises recognizing instructions within documents to override image selection.

16. The method of claim 12, further comprising filtering terms following a differentiation analysis.

17. The method of claim 12, wherein the at least one differentiating term is filtered by text analytics using a language model.

18. The method of claim 12, wherein the system filters blacklisted phrases and lower-weighted overlapping phrases.

19. The system of claim 1, wherein the determining of the at least one differentiating term includes utilizing a probabilistic based approach or a knowledge-based approach.

20. The method of claim 12, wherein the measure of differentiation is a term frequency inverse document frequency (TF-IDF) measure or a cue validity measure.

* * * * *